United States Patent
Rygh et al.

(10) Patent No.: US 7,436,845 B1
(45) Date of Patent: Oct. 14, 2008

(54) INPUT AND OUTPUT BUFFERING

(75) Inventors: Hans Rygh, Oslo (NO); Morten Schanke, Oslo (NO); Ola Torudbakken, Oslo (NO); Steinar Forsmo, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 841 days.

(21) Appl. No.: 10/863,038

(22) Filed: Jun. 8, 2004

(51) Int. Cl.
*H04L 12/56* (2006.01)

(52) U.S. Cl. .................. 370/413; 370/351; 370/360; 370/412; 370/429; 370/462; 710/1; 710/36; 710/38

(58) Field of Classification Search ............ 370/351, 370/359, 360, 389, 412, 413, 447, 462; 710/1, 710/20, 36, 38
See application file for complete search history.

(56) References Cited

U.S. PATENT DOCUMENTS 6,920,106 B1 * 7/2005 Chou et al. ................ 370/229
7,180,862 B2 * 2/2007 Peebles et al. ............. 370/235
2004/0081394 A1 * 4/2004 Biran et al. ................... 385/31
2004/0252685 A1 * 12/2004 Kagan et al. ............... 370/389

* cited by examiner

*Primary Examiner*—Huy D. Vu
*Assistant Examiner*—Asif H Khan
(74) *Attorney, Agent, or Firm*—Park, Vaughan & Fleming LLP (57) ABSTRACT

An Infiniband device is provided. The device has a plurality of input/output ports. Each port has associated therewith an input buffer for storage of a packet received at that port. Each port also has associated therewith a plurality of output buffers for storage of a packet transmitted from an input buffer via a switching matrix. Each port is arranged to share its associated plurality of output ports with at least one other port. Each input buffer is also associated with a single output buffer of each shared plurality of output buffers. A packet received at an input buffer is transmitted to all associated output buffers via the switching matrix in parallel with an output buffer select signal. The output buffer select signal is sent to less than all of the associated output buffers, any output buffer not receiving the output buffer select signal is configured to discard the packet transmitted from the input buffer.

12 Claims, 9 Drawing Sheets

INPUT AND OUTPUT BUFFERING

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK" (application Ser. No. 10/863,019, filed 8 Jun. 2004), Inventors: Bjorn Dag Johnsen, Christopher Jackson, David Brean and Ola Torudbakken;

"SWITCH METHOD AND APPARATUS WITH CUT-THROUGH ROUTING FOR USE IN A COMMUNICATIONS NETWORK" (application Ser. No. 10/863,016 filed 8 Jun. 2004), Inventors: Bjorn Dag Johnsen, Hans Rygh and Morten Schanke;

"SWITCHING METHOD AND APPARATUS FOR USE IN A COMMUNICATIONS NETWORK" (application Ser. No. 10/862,970, filed 8 Jun. 2004), Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" (application Ser. No. 10/863,854, filed 8 Jun. 2004), Inventors: Bjorn Dag Johnsen, Christopher Jackson, David Brean, Ola Torudbakken;

"CREDIT ANNOUNCEMENT" (application Ser. No. 10/863,373, filed 8 Jun. 2004), Inventors: Morten Schanke, Hans Rygh, Marius Hansen and Mathias Hoddevik;

"ADAPTIVE CUT-THROUGH ALGORITHM" (application Ser. No. 10/862,987, filed 8 Jun. 2004), Inventors: Morten Schanke, Brian Manula and Magne Sandven;

"COMMA DETECTION" (application Ser. No. 10/863,374, filed 8 Jun. 2004), Inventors: Magne Sandven, Morten Schanke and Brian Manula;

"SERVICE LEVEL TO VIRTUAL LANE MAPPING" (application Ser. No. 10/862,985, filed 8 Jun. 2004), Inventors: Steinar Forsmo, Hans Rygh and Ola Torudbakken;

"CODEC IMPLEMENTATION FOR INFINIBAND" (application Ser. No. 10/863,439, filed 8 Jun. 2004), Inventors: Steinar Forsmo, Mathias Hoddevik and Magne Sandven;

"VCRC CHECKING AND GENERATION" (application Ser. No. 10/863,013, filed 8 Jun. 2004), Inventors: Steinar Forsmo, Hans Rygh, Morten Schanke and Ola Torudbakken;

"COMMUNITY SEPARATION ENFORCEMENT" (application Ser. No. 10/863,544, filed 8 Jun. 2001), Inventors: Ola Torudbakken and Bjorn Dag Johnsen;

"STUMPING MECHANISM" (application Ser. No. 10/863,372, filed 8 Jun. 2004), Inventors: Brian Manula, Ali Bozkaya and Magne Sandven.

The above-identified applications are all hereby incorporated by reference into the present application.

FIELD

The present invention relates to input and output buffering, and in particular but not exclusively to combined input and group-wise output buffering for switches.

INTRODUCTION

In switches for Infiniband™ networks, there is a general requirement to reduce the latency and increase efficiency through the switch such that transmission times of packets across the network can be reduced. In order to increase efficiency, resource contention within the switch must be minimised, in order to reduce delays to packets passing through the switch being caused by waiting for switch resources to become available to process that packet. At the same time, these is a general desire to produce components as cheaply as possible, which in the case of integrated circuit devices typically translates to a desire to make the device as small as possible to use as little area of integrated circuit substrate as possible.

SUMMARY OF THE INVENTION

The present invention has been made, at least in parts, in consideration of problems and drawbacks of conventional systems.

Viewed from a first aspect, the present invention provides an Infiniband device. The device can have a plurality of input/output ports. Each port can have associated therewith an input buffer for storage of a packet received at that port. Each port can also have associated therewith a plurality of output buffers for storage of a packet transmitted from an input buffer via a switching matrix. Each port can be arranged to share its associated plurality of output buffers with at least one other port. Each input buffer can also be associated with a single output buffer of each shared plurality of output buffers. A packet received at an input buffer can be transmitted to all associated output buffers via the switching matrix in parallel with an output buffer select signal. The output buffer select signal can be sent to less than all of the associated output buffers, any output buffer not receiving the output buffer select signal can be configured to discard the packet transmitted from the input buffer. This arrangement provides for high efficiency and low latency in transfer of packets though a switch, thereby increasing overall performance of the switch.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

Figure 1:
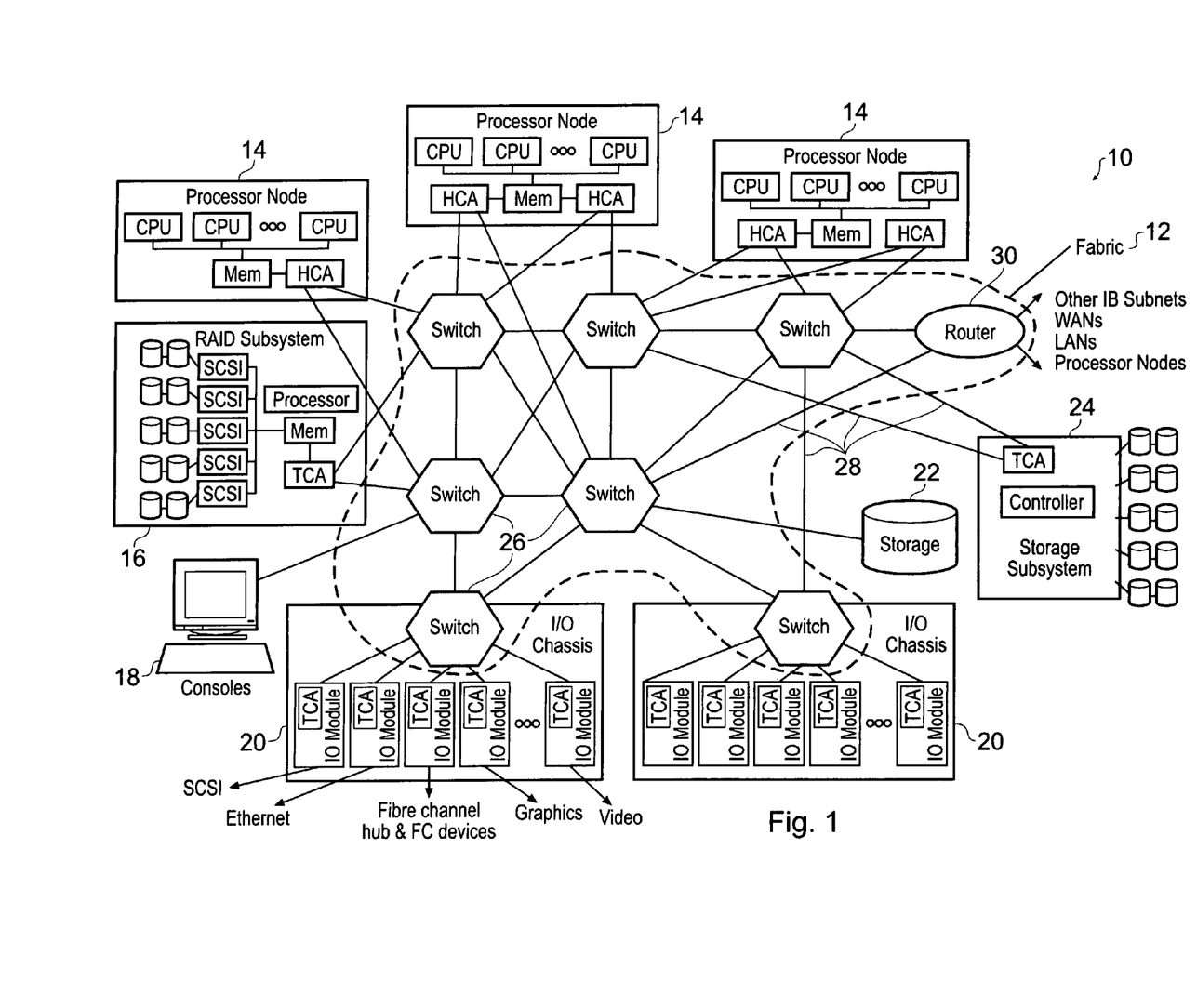
FIG. 1 is a schematic block diagram showing an example of interconnection of computing system elements via the Infiniband™ networking architecture.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections there-between and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 14 may comprise a plurality of processors and each processor may have one or more individual Queue Pairs assigned to handle requests and responses flowing to and from that processor of that processor node 14 via the fabric 12. Alternatively, or in addition, a processor of a given processor node 14 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
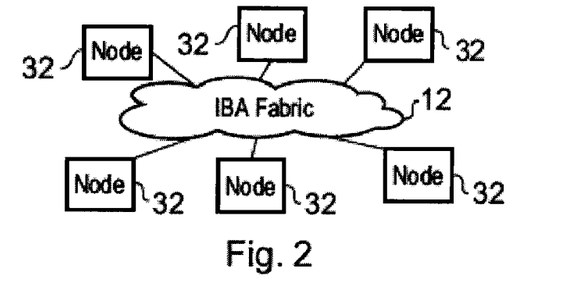
FIG. 2 is a schematic block diagram of a simplified arrangement of an Infiniband™ Architecture system.
Figure 3:
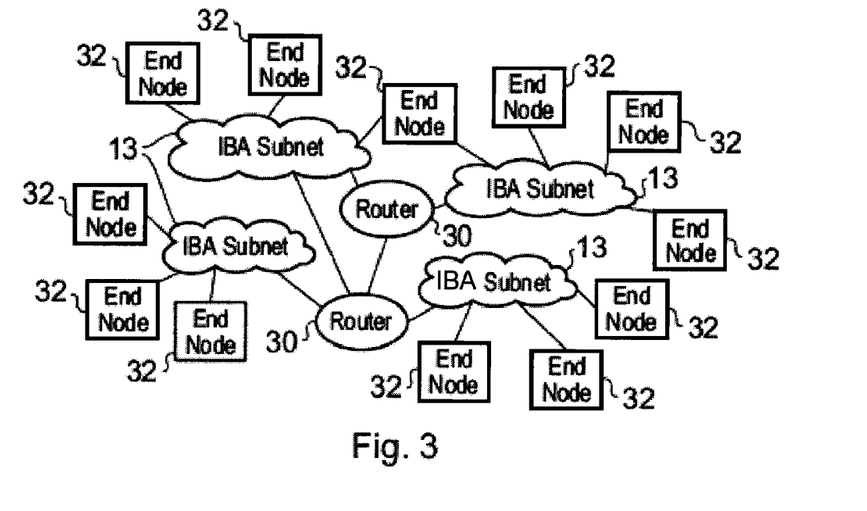
FIG. 3 is a schematic block diagram of another simplified arrangement of an Infiniband™ Architecture system.
Figure 4:
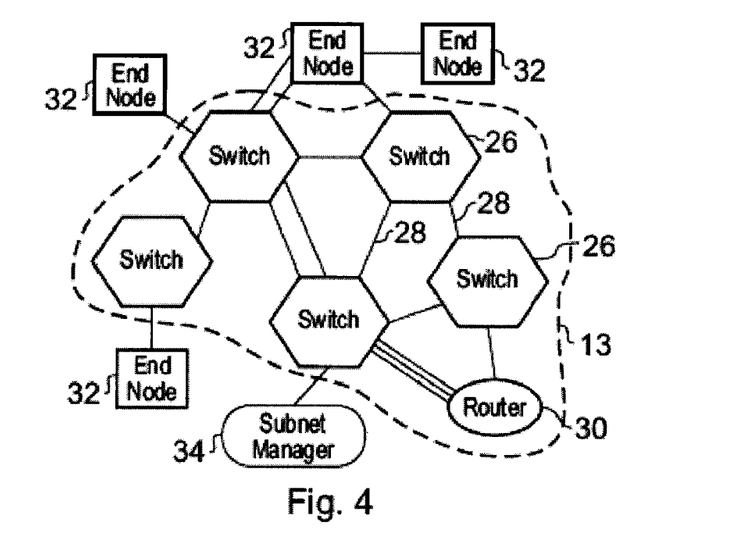
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
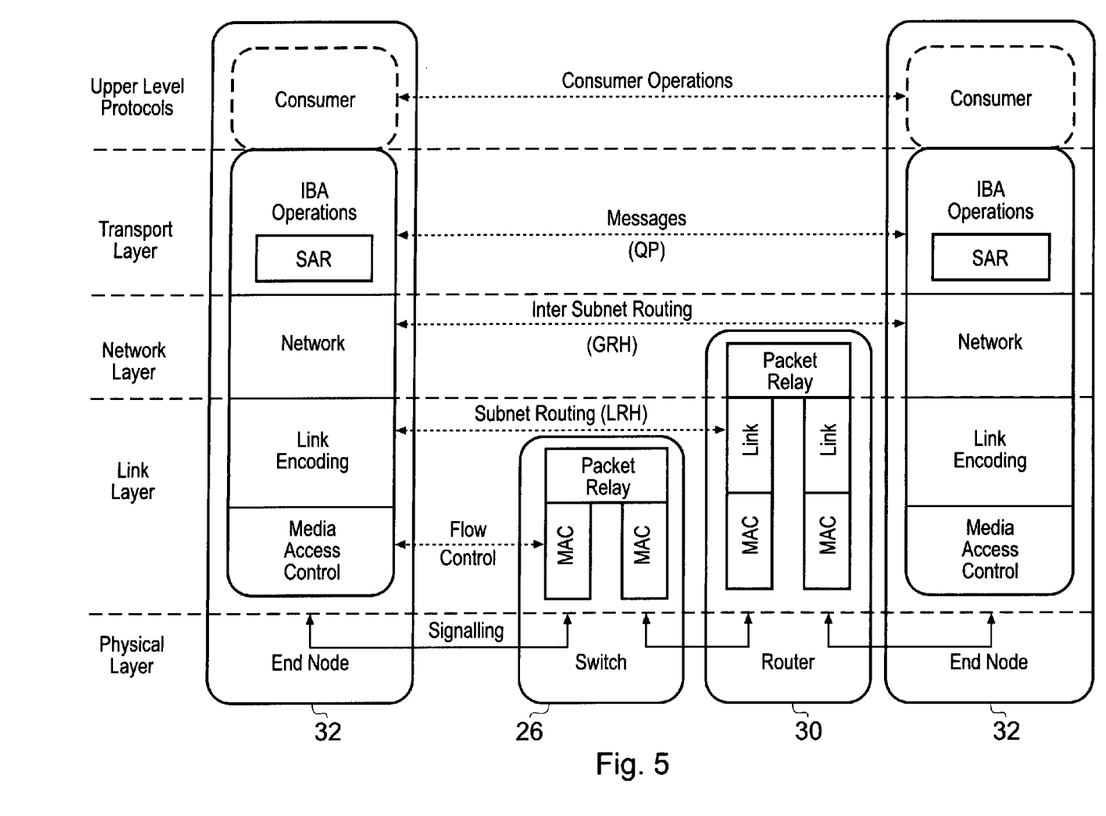
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

Figure 6:
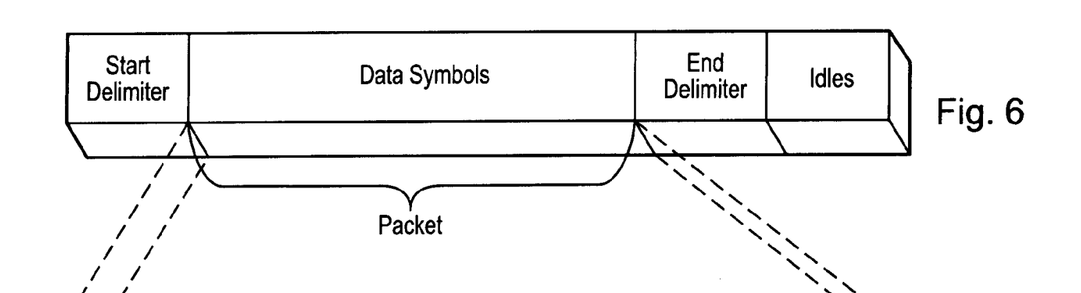
FIG. 6 shows schematically the structure of a message to be transmitted via an Infiniband™ Architecture.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
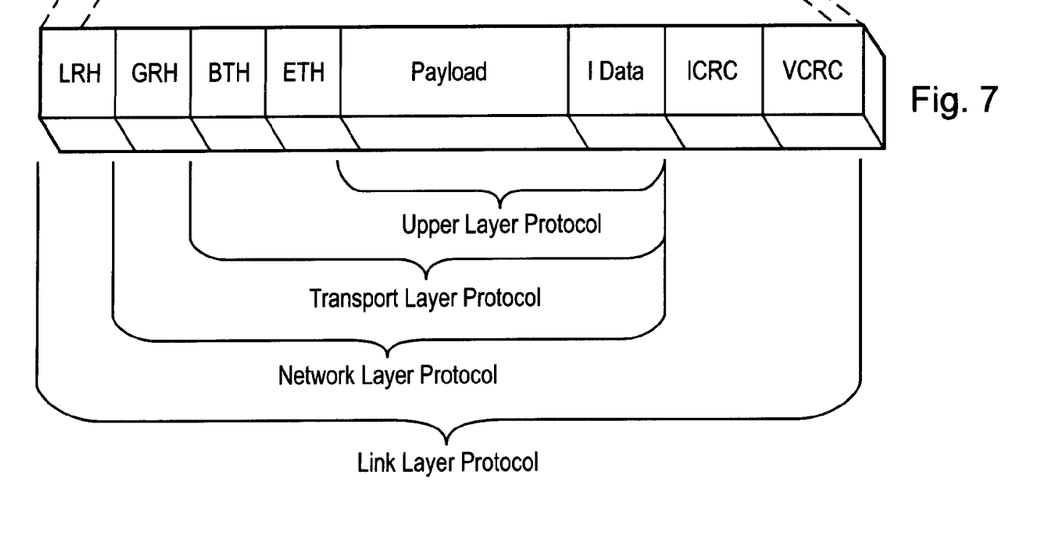
FIG. 7 shows schematically the format of a packet of the message of FIG. 6.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit". A credit limit is an indication of the total amount of data that the transmitter has been authorised to send since link initialization.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialization. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialized for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
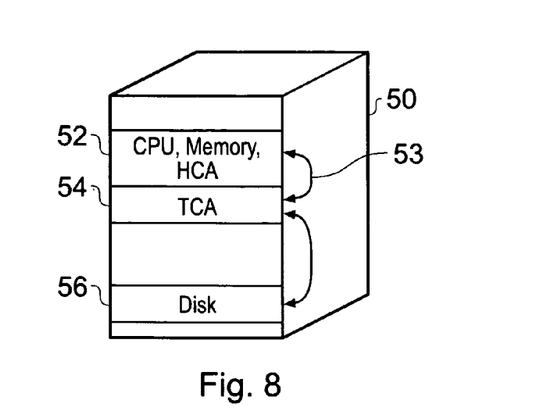
FIG. 8 is a schematic block diagram showing an arrangement where the Infiniband™ Architecture is used to interconnect components within a computer system.
Figure 9:
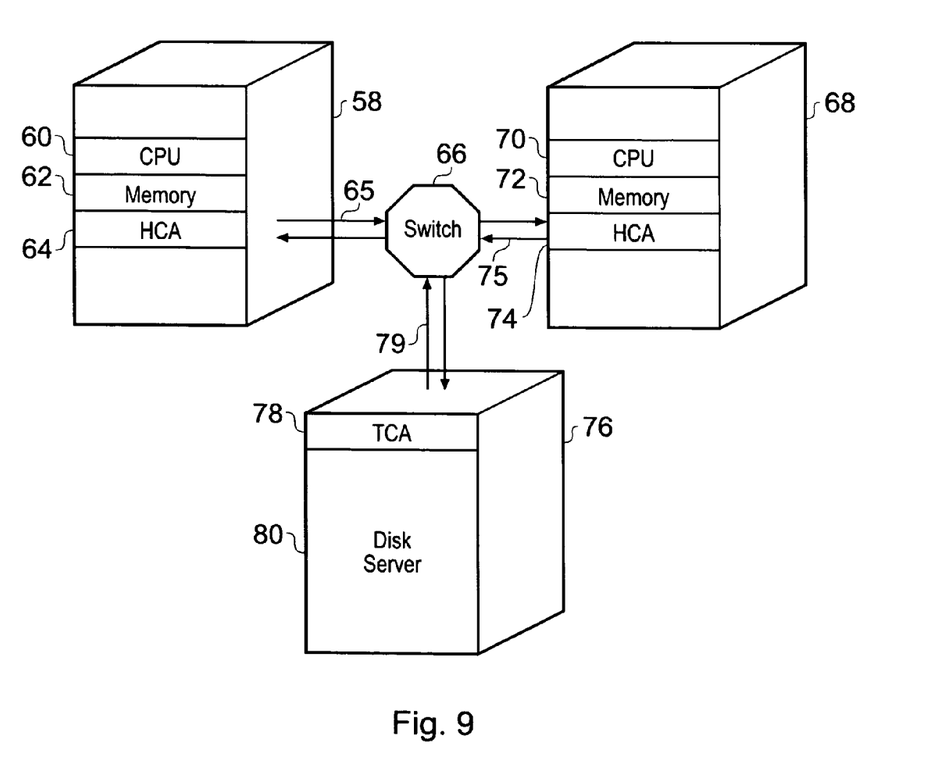
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than one distinct computer systems. There is no limitation that the techniques of the examples of FIGS. 8 and 9 should be practiced separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
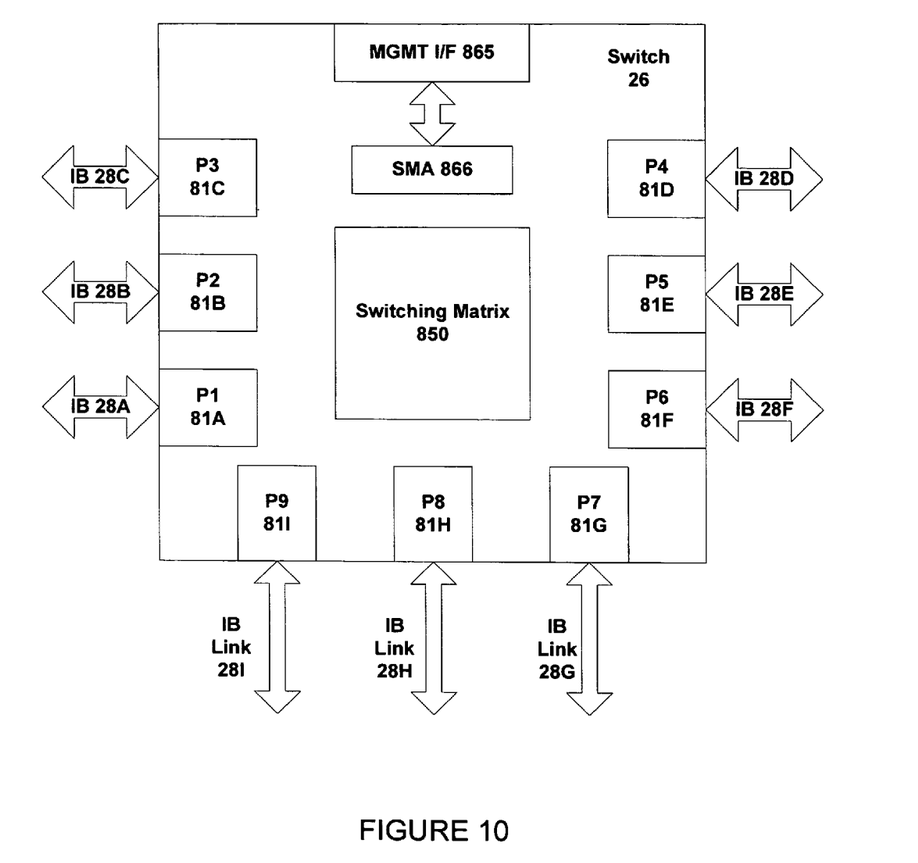
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL 15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL 15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

Figure 11:
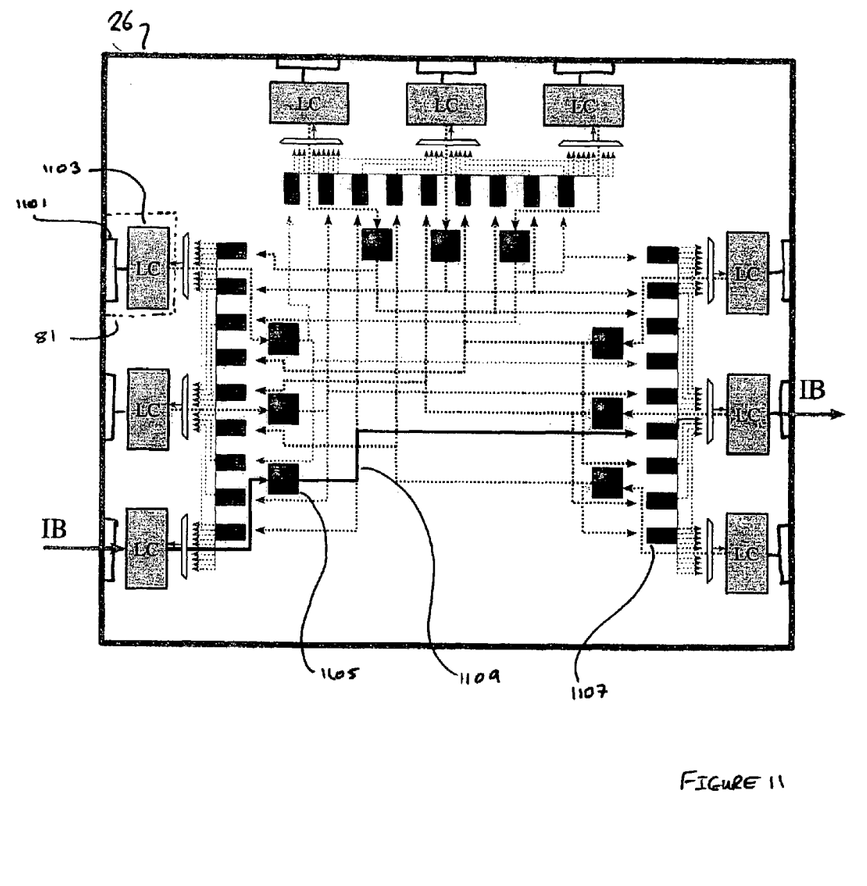
FIG. 11 is a schematic representation of a path and queue arrangement through the switch of FIG. 10.
Figure 12:
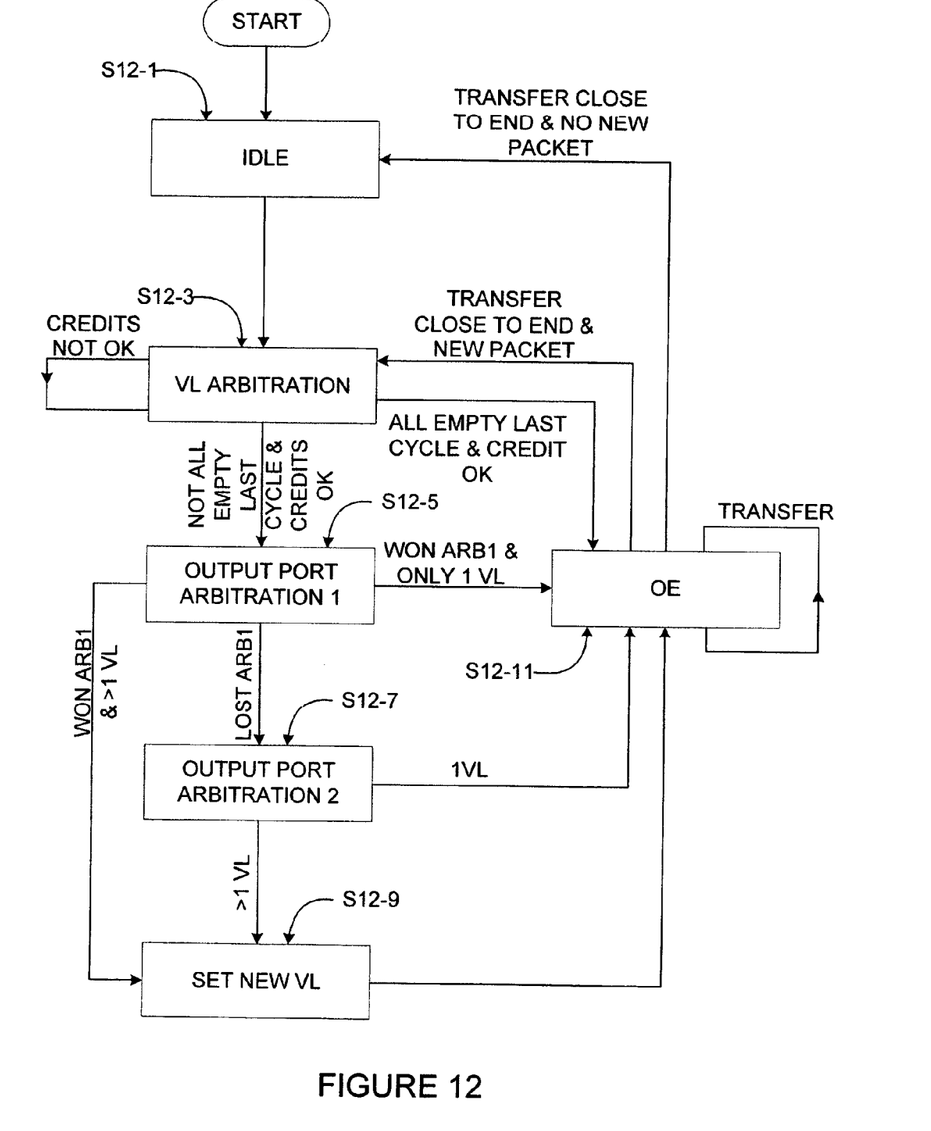
FIG. 12 is a flow chart illustrating an output arbitration scheme for an output stage of the switch of FIG. 10.
Figure 13:
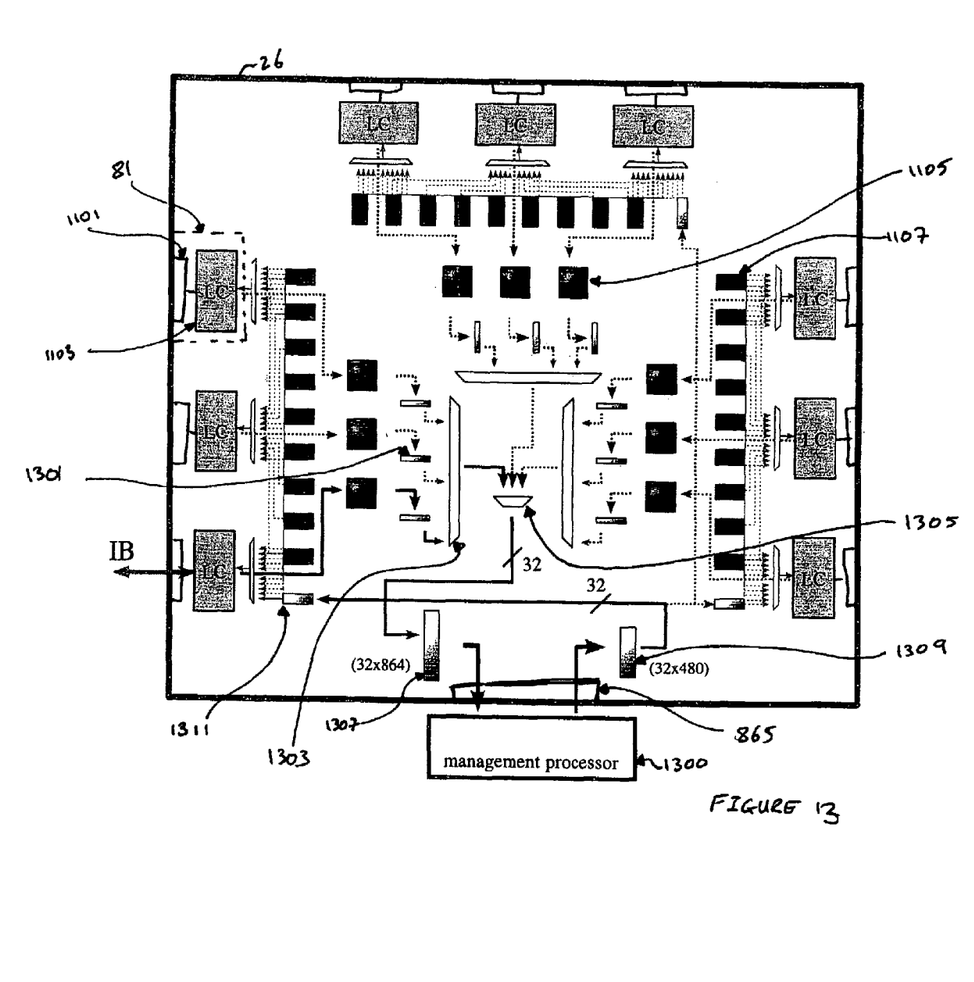
FIG. 13 is a schematic representation of a path and queue arrangement through the switch of FIG. 10.

With reference to FIGS. 11, 12 and 13, there will now be described an example of a way in which the switching matrix 850 can be configured to efficiently move packets from an input port to a destination output port or to a management processor.

As shown in FIG. 11, a switch 26 can include a number of ports, each port being made up of port hardware 1101 and a LinkCore 1103. The port hardware 1101 provides physical layer services including transmission and reception over a link, transmission encoding and decoding, clock recovery, serialization and deserialization, and lane deskewing. The LinkCore 1103 performs operations based on the content of the packet, for example, output port and virtual lane determination (in the following, a reference to a particular VL describes both a port and the VL of that port), partition management, and error checking.

Each port 81 has an input queue 1105 associated therewith. The input queue 1105 is sufficiently large to store a number of maximum size data packets waiting to be forwarded on to an output port. Packets received at the port 81 can be forwarded to the input queue 1105 along with an indication of output port and virtual lane as determined by the LinkCore 1103. Packets are stored in the input queue 1105 according to inbound VL, i.e. the VL over which they were received.

For the input queue 1105, a packet can be transferred to an output queue 1107 as indicated by arrows 1109. It is the input queues 1105, output queues 1107 and the interconnections there-between that make up the switching matrix 850. In the present example, each input queue 1105 has three associated output queues 1107. Each of those three output queues 1107 is in turn associated with the output port of each of three ports 81. Thus any packet which is to be transmitted from a port in any given group of three ports 81 will be transferred to the output queue 1107 associated with that group. In the present example, the ports 81 are not grouped in terms of input function but are grouped in terms of output function. Packets are stored in the output queue 1107 according to outbound VL. Thus each output queue 1107 has an area for storage of packets destined to be transmitted from each outbound VL which exists for the group of ports which are associated with the queue. The packets stored in each VL area of the output queue could be for any port of the group of shared output ports. As will be appreciated, as a given outbound VL may point to any number of final destinations (i.e. the ultimate destination of the packet), each area within each outbound queue 1107 may store packets for any number of different ultimate destinations. In the present example, the space allocated to each outbound VL is fixed. In other examples, the space can be allocated at a start-up phase of operation of the switch. In other examples the space can be re-allocated on the basis of expected or experienced traffic patterns, however a rolling re-allocation of space could cause difficulties for a system where latency caused by internal transmission through the switch is to be minimised using a known available space calculation.

Control of transfer from input queues 1105 to output queues 1107 is performed using a queue_select signal. Each time that a packet is transferred from an input queue 1105, the packet is in fact transferred to all of the output queues 1107 associated with that input queue. In parallel with the transfer of the packet, the input queue 1105 outputs a queue_select signal to each output queue 1107 for which the packet is intended. For a unicast packet, this will be a single output queue, but for a multicast packet it could be for a single output queue, or could be for multiple output queues. Any output queue 1107 which does not receive a queue_select signal at the same time as starting to receive a packet ignores the incoming data and does not store it into the queue.

To ensure high efficiency of the device, the switch of the present example does not need to wait for an entire packet to be present in an input queue 1105 before commencing transfer of that packet to the necessary output queue(s) 1107. In the event of a packet transfer from input queue to output queue being interrupted for any reason, for example if the area for the current VL of the output queue runs out of space, the output queue will pause and await the remainder of the packet and will not need the queue_select signal to complete the transfer. Similarly, the switch of the present example does not need to wait until all of the packet is present in the output queue 1107 before commencing onward transmission of the packet from an output port. In this case, there is a requirement that all of the packet will have arrived in the output queue prior to completion of transmission of the packet from the port as all of the packet must be transmitted contiguously from the port. As will be appreciated if the speed of the input port is greater than or equal to the speed of the output port, then transmission of the packet from the port can commence immediately. Various read-out commencement algorithms can be implemented to achieve a minimal latency, high reliability solution.

In order to further increase the efficiency of the device, the switch of the present example can be configured to bypass the input queue 1105 in certain circumstances. If all of the output buffers 1107 with which the input buffer 1105 to be bypassed is associated are empty, then the packet can be transferred directly from the LinkCore 1103 to the output queues 1107. In the present example, the switch is configured to perform such a bypass operation in the event that the all of the relevant output queues 1107 are totally empty, i.e. empty for all VLs, and any queues in a path to a management processor interface (discussed with reference to FIG. 13 below) are empty. In other examples, the bypass could take place if at least the part of the output queue corresponding to the required output VL is empty.

The movement of a packet from an output queue 1107 to a port 81 is handled in the present example by an output arbitration scheme. The output arbitration scheme controls the movement of data from the output queues to the actual ports. This is necessary because in the present example, each group of three ports has associated therewith nine output queues, one associated with the input queue for each port (plus one additional management output queue, described with reference to FIG. 13 below, making 10 output queues in total).

The arbitration scheme ensures that a packet is moved from an output queue 1107 to the relevant outbound port as soon as possible after the packet being written into the output queue. An example of a suitable arbitration scheme will now be described with reference to FIG. 12.

FIG. 12 is a flow chart illustrating an example arbitration scheme for transfer of packets from output queues 1107 to destination outbound VLs. In the present example, each outbound port runs its own arbitration scheme to move packets from the output queues to the VLs of that port for outbound transmission. In the following description, the port running the arbitration scheme will be referred to as the current port.

As shown in FIG. 12, the arbitration scheme, once started moves to an idle state at S12-1. In this idle state the arbitration scheme waits for packets to be written into the output queues 1107. Upon detecting that a new packet has been written into one of the queues 1107, the scheme moves to perform Virtual Lane Arbitration at step S12-3. In the present example, each VL of the output queue has a register holding a descriptor value for the number of packets in the queue. The descriptor value is incremented when a packet not previously considered by the arbitration system is written into the queue and is decremented when a packet is read out of the queue. At the VL arbitration step a next VL to consider is selected. The arbitration simply chooses a next VL to consider from all of the VLs which are available at the port with which the queue is associated. The VL arbitration is detailed in the Infiniband specification.

The VL arbitration only takes place if sufficient transmit credit is available for at least one of the VLs for which there are packets in the output queues.

Following selection of a next VL to operate on, one output queue holding a packet for the selected VL is chosen at random. If all of the VL spaces of the selected output queue were empty at the previous cycle, then (since only one packet can be transferred from an input queue at one time) the output queue must only be holding one packet (or at least the header of it) and that packet must be for the port running the arbitration scheme. It is therefore certain that no other output ports will want to read out from that queue and there will therefore be no access conflict. As a result, there is no need to run an output port arbitration. The process therefore continues at step S12-11.

At step S12-11 a packet is read out of an output queue and passed to the LinkCore 1103. In the present example, the output queues are permanently maintained in an Output-Enabled (OE) state. Therefore, at step S12-11 the LinkCore 1103 is signalled that data is ready for onward transmission and therefore must start sampling the data from the queue, processing the data for transmission and transmitting the data over the Infiniband link.

On the other hand, if the selected output queue was not empty during the previous cycle, one of the other ports 81 which share the output queue in question may wish to access data in that queue. The processing then continues at step S12-5.

In step S12-5, a first output port arbitration takes place. This arbitration step decides which port gets to read from the selected output queue next. The output port arbitration decides a situation where more than one port wishes to read out from the same output queue at the same time. The arbitration solves such a conflict by allocating read-out rights in a least-recently-used fashion. The port which is awarded read-out rights by the arbitration is considered to have "won" the arbitration, all other ports have "lost" the arbitration.

Thus if the current port wins the arbitration and the output queue holds packets for more than one VL, then processing continues at step S12-9 where the VL for data transfer is set at the output queue. Once the read-out logic for the output queue has been set, processing continues at step S12-11 where the packet is transferred from the output queue to the port and then transmitted from the port over the Infiniband link.

On the other hand, if the current port wins the arbitration and the output queue holds packets for only one VL, then there is no need to set the VL at the output queue and thus step S12-9 can be omitted and processing passes directly to step S12-11 where the packet is transferred from the output queue to the port and then transmitted from the port over the Infiniband link.

However, if the current port loses the first output port arbitration at step S12-5, then a second output port arbitration is performed at step S12-7. This second output port arbitration is performed if there are any more packets for the selected VL in any of the output queues other than the one to which read-out rights were lost during the first output port arbitration. If there are no other packets waiting in the remaining output queues, the system waits until a packet for the current VL arrives in one of the remaining output queues. As the arbitration uses a least recently used condition, this ensures that no one port loses an output port arbitration more than twice in a row. In other examples, processing could return to the VL arbitration at step S12-3 and determines a new VL to consider if there are no other packets waiting in the remaining output queues.

The second output port arbitration works in the same was as the first output port arbitration, however, as one of the other ports has already won the first output port arbitration and is thus busy transferring data, the second arbitration is between the current port and the remaining other port. The arbitration decides which of the remaining two ports get access to the next selected queue. If the remaining other port does not desire access to the next selected queue, then the current port is treated as having won the second output port arbitration.

If the other remaining port does desire access to the next selected queue, then the second arbitration takes place. If the current port wins the second arbitration, or if the current queue loses the arbitration but a third queue has packets for the selected VL, then the current port can perform a packet transfer.

On the other hand, if the current port loses the second arbitration and no other queues have packets for the currently selected VL, the system waits until a packet for the current VL arrives in one of the remaining output queues.

If the current port wins the second output port arbitration at step S12-7, or loses that arbitration but there are packets for the selected VL at another output queue not considered at either the first or second output port arbitrations, then a packet transfer can be carried out for the current VL. As with the situation following the result of the first output arbitration, if the queue containing the packet to be transferred contains packets for the current VL only, then processing can move directly to transfer of the packet at step S12-11. On the other hand, if the queue containing the packet to be transferred contains packets for multiple VLs, then the logic controlling read-out from the queue must be informed of the current VL at step S12-9 before transfer commences at step S12-11.

Finally, when a packet is being transferred, and the end of the packet is reached, then the processing moves to either Idle (step S12-1), if there are no new packets in the output queues, or to VL arbitration (step S12-3) if there is at least one new packet in the output queues. The move to Idle or VL arbitration states can be performed before the end of the packet has been transferred from the port. This is because, the processing to determine a next packet to transmit from the port takes time and thus can be started at a time prior to the completion of packet transmission so that another packet can be selected ready for transmission as soon as the current packet transmission has completed. As it is not known how many steps will be required to select a next packet (depending on output port arbitrations and requirements for setting VL at an output queue), the return to the Idle or VL Arbitration states can be made once the number of cycles required to finish transfer of the current packet from the LinkCore is equal to or less than the minimum number of cycles which could be required to select a next packet and commence transfer of that next packet to the LinkCore.

With reference to FIG. 13, there will now be described an example of a way in which the switching matrix 850 can be configured to efficiently move packets from an input port to and from a management processor via the management processor interface 865.

As shown in FIG. 13, the switch 26 includes a number of ports 81 as described above with reference to FIG. 11. Each port has associated therewith an input queue 1105 and a plurality of output queues 1107 which output queues the port shares with a number of other ports as described above.

When a port receives a packet destined for a management processor 1300 connected to the switch 26 via the management interface 865, the packet can be routed through the switch using a different system to that used for packets requiring immediate inward transmission. In the switch of the present example, each input queue 1105 has associated therewith a management packet input buffer 1301. The management packet input buffer 1301 can provide a place to move a received management packet to as quickly as possible so as to leave the paths through the switch to the output queues 1107 as uninterrupted as possible. The path to and from the management processor is typically slower than the paths between the input and output queues, so packets destined for the management processor could, if left in the main input queues, cause congestion within the switch. Such packets are therefore, in the present example, moved to the management packet input buffer in which they can wait to be read out to the management processor without reducing the available bandwidth in the main input queues.

Once a management packet has been placed into a management packet input buffer 1301 it is transferred to a management processor input buffer 1307 via an arbitration system implemented at multiplexers 1303 and 1305. This arbitration scheme can be based on a simple alternating priority system, or on a more complicated system if desired. In the present example, the arbitration runs on a fifo (first-in-first-out implemented by a linked list) scheme, where packets arriving at the same cycle are ordered randomly. Once in the management processor input buffer 1307, the packets are transferred to the management processor 1300 for processing.

If a packet is to be transmitted from the management processor 1300 over the Infiniband fabric, it can be simply inserted into the Infiniband data streams passing through the switch. The management packet for transmission is first written into a management processor output buffer 1309. This buffer then acts in the same way as the input queues 1305 to forward the management packet. Thus the management processor output buffer 1309 sends the management packet to each of a plurality of dedicated management packet output queues 1311, along with an output queue select signal to indicate which of the management packet output queues 1311 the management packet is intended for. The management packet is then transferred to the required port 81 by inclusion of the management packet output queue 1311 in the output queue arbitration scheme described above. The management packet can thus be transmitted from the required port.

As will be appreciated, the majority of management packets will travel over the dedicated service and management VL, VL15, although management packets can be transmitted over other VLs.

Thus there has now been described a combined input and group-wised output buffering arrangement for an Infiniband switch. A switch having such a buffering arrangement experiences a greater efficiency and a lower latency than a pure input queued switch, yet requires less silicon real-estate than a full output queued switch. Thus a switch having such a buffering arrangement provides high efficiency and low latency at a low cost.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An Infiniband device comprising:
a plurality of input/output ports, each port having associated therewith an input queue for storage of a packet received at that port, each port also having associated therewith a plurality of output queues for storage of a packet transmitted from an input queue via a switching matrix, each port being arranged to share its associated plurality of output queues with at least one other port;
wherein each input queue is associated with a single output queue of shared plurality of output queues; and
wherein a packet received at an input queue is transmitted to all associated output queues via the switching matrix in parallel with an output queue select signal, the output queue select signal can be sent to less than all of the associated output queues, any output queue not receiving the output queue select signal can be configured to discard the packet transmitted from the input queue.

2. The device of claim 1, wherein the output queue select signal is received by the output queues prior to the commencement of arrival of the packet at the output queues.

3. The device of claim 2, wherein the output queue select signal is sent by the input queue before completion of a queue transmit setup process at the input queue.

4. The device of claim 1, wherein a packet received at an output queue is moved to a relevant output port at a time determined by an output arbitration scheme.

5. The device of claim 4, wherein the output arbitration scheme monitors all output queues in a given shared plurality of output queues to determine a time for transferal of any given packet in any of the queues in the shared plurality of output queues to a relevant output port for that packet.

6. The device of claim 5, wherein the output arbitration scheme determines the time for transferal of packets on the basis of an output virtual lane assignment for the packet.

7. The device of claim 6, wherein the output arbitration scheme determines the time for transferal of packets on the basis of whether another more than one port wishes to transfer a packet from the same queue at the same time.

8. The device of claim 5, wherein the output arbitration scheme is configured to resolve a conflict between multiple ports on a least-recently-used basis.

9. The device of claim 5, wherein each port runs an output arbitration scheme.

10. The device of claim 1, further comprising a management processor interface for connection of a management processor to the switch, the device also comprising a management packet input queue associated with each input queue, and a management processor packet queue, each input queue being configured to transfer a management packet received therein to the associated management packet input queue and each management packet input queue being configured to transfer a management packet received therein to the management processor packet queue, the management processor being configured to read management packets from the management processor packet queue.

11. The device of claim 10, further comprising an arbitration scheme for transfer of management packets from the plurality of management packet input queues and the management processor packet queues.

12. The device of claim 10, further comprising a management packet input buffer, and a plurality of management packet output queues, one management packet output queue being associated with each shared plurality of output queues, the management packet input buffer being configured to receive a management packet for transmission from one of the ports of the switch from the management processor and to forward the management packet to all of the management packet output queues via the switching matrix in parallel with a management packet output queue select signal, wherein the management packet output queue select signal can be sent to less than all of the management packet output queues.

* * * * *